United States Patent [19]

Albrecht et al.

[11] 4,392,136

[45] Jul. 5, 1983

[54] CIRCUIT ARRANGEMENT FOR STORING SIGNAL VALUES

[75] Inventors: Werner Albrecht, Markt Bibart; Klaus Fischer; Gerhard Grün, both of Nuremberg, all of Fed. Rep. of Germany

[73] Assignee: Licentia Patent-Verwaltungs-GmbH, Frankfurt am Main, Fed. Rep. of Germany

[21] Appl. No.: 288,927

[22] Filed: Jul. 31, 1981

[30] Foreign Application Priority Data

Jul. 31, 1980 [DE] Fed. Rep. of Germany ....... 3029033
Jul. 31, 1980 [DE] Fed. Rep. of Germany ... 8020552[U]

[51] Int. Cl.³ .................... H04Q 9/00; G08C 19/28; H03K 21/36
[52] U.S. Cl. ........................ 340/825.56; 340/870.27
[58] Field of Search .................. 340/870.27, 825.56, 340/347 DD; 235/92 SA, 92 PE, 92 EA

[56] References Cited

U.S. PATENT DOCUMENTS 3,761,944 9/1973 Shimojo .
3,840,866 10/1974 St. Clair et al. ................ 340/870.27
4,158,767 6/1979 Long .............................. 235/92 SA
4,309,598 1/1982 Davis, Jr. ....................... 235/92 PE

FOREIGN PATENT DOCUMENTS 2153108 2/1975 Fed. Rep. of Germany .
2723777 11/1978 Fed. Rep. of Germany .
136194 6/1979 German Democratic Rep. .

Primary Examiner—Donald J. Yusko
Attorney, Agent, or Firm—Spencer & Kaye

[57] ABSTRACT

In a circuit arrangement including a plurality of multi-position data switches and a memory connected for storing, in respective addressable memory locations, representations of the positions of the data switches, each data switch is a multi-digit coding switch having an actuating input and a plurality of code outputs at which appear a set of signals representative of the setting of the switch upon appearance of a signal at its actuating input, and the arrangement further includes a multiplex signal generator having a plurality of clock outputs each connected to the actuating input of a respective coding switch, the generator being arranged to produce a sequence of pulse signals and to deliver each pulse signal of the sequence to a respective clock output, and a bus bar composed of a plurality of conductors equal in number to the number of code outputs of each coding switch, with each conductor being connected between the memory and a respective coding output of each coding switch so that the appearance of a signal at the actuating input of one coding switch causes the set of signals representative of the current setting of that switch to appear on the conductors.

4 Claims, 3 Drawing Figures

CIRCUIT ARRANGEMENT FOR STORING SIGNAL VALUES

BACKGROUND OF THE INVENTION

The present invention relates to a circuit arrangement of the type including data switches and a memory for storing representations of values representative of the positions, or settings, of the data switches.

In a known circuit arrangement of this type, as disclosed in German Auslegeschrift [Published Application] No. 2,723,777, a plurality of data switches are combined into an input pad and each serves for generating a binary coded signal which is fed into a memory. However, in order to bring this signal to the desired location, or address, in the memory, further address selection switches are provided which are associated with respective memory addresses. Only by actuating the data switches and the selection switches can a selected signal representation be introduced into the memory. The number of signal representations that can be put in is here determined by the number of data switches provided.

SUMMARY OF THE INVENTION

It is an object of the present invention to provide a circuit arrangement of the above described type in which a plurality of data switches are automatically interrogated as to their setting, each data switch having a plurality of data settings, and wherein the number of inputs for the input of data words to be furnished by the data switches is reduced to a minimum.

This and other objects are accomplished according to the present invention, in a circuit arrangement including a plurality of multi-position data switches and a memory connected for storing, in respective addressable memory locations, representations of the positions of the data switches, by constituting each data switch by a multi-digit coding switch having an actuating input and a plurality of code outputs at which appear a set of signals representative of the setting of the switch upon appearance of a signal at its actuating input, and by providing a multiplex signal generator having a plurality of clock inputs each connected to the actuating input of a respective coding switch, the generator being arranged to produce a sequence of pulse signals and to deliver each pulse signal of the sequence to a respective clock output a bus bar composed of a plurality of conductors equal in number to the number of code outputs of each coding switch, with each conductor being connected to a respective coding output of each coding switch so that the appearance of a signal at the actuating input of one coding switch causes the set of signals representative of the current setting of that switch to appear on the conductors, and signal transmitting means connected between the bus bar and the memory.

In circuit arrangement according to the invention, the memory thus need have only as many inputs as are required by the highest value setting of a code switch. Thus, for binary coding, each coding switch can be settable from 0 to 15 if four inputs are available for memory access. However, due to multiplex operation, a number of values corresponding to n times the highest value can be fed into the memory.

The present invention will now be explained in detail with the aid of circuit diagrams of embodiments.

DESCRIPTION OF THE PREFERRED EMBODIMENTS

Figure 1:
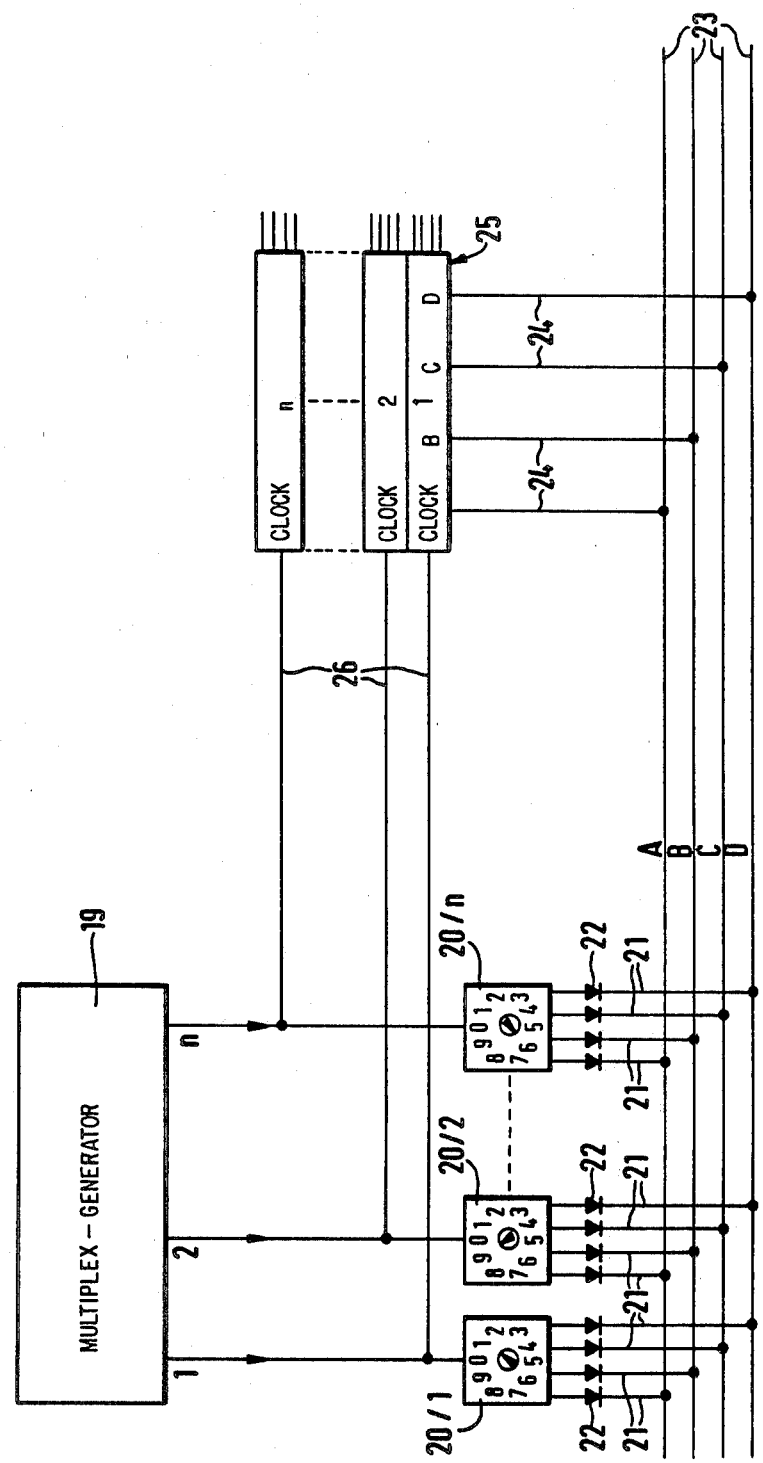
FIG. 1 is a block circuit diagram of a circuit arrangement according to the invention with direct input into a memory.

In the circuit of FIG. 1, the outputs 1, 2, ... n of a multiplex generator 19 are connected to the input lines of a corresponding number of binary coded coding switches 20/1, 20/2, ... 20/n. Each coding switch 20 has ten switch positions corresponding to decimal values from 0 to 9 and, in each of these switch positions, emits four parallel bits constituting a binary coded data word corresponding to the respective switch position. For example in the switch position 0, the emitted data word is 0000, in switch position 5 the data word is 0101, in switch position 9 the data word is 1001.

Thus four code outputs 21 are required at each one of the coding switches 20 and these code outputs 21 are connected, via identically polarized decoupling diodes 22, to respective conductors of a four conductor bus bar 23. Equivalent code outputs 21 of the several coding switches 20 are always connected to the same conductor of the bus bar 23, i.e. all lease significant bit outputs are connected to the same conductor, etc. One input 24 of a memory 25 having n memory locations, or addresses, is connected to each one of the individual conductors of the bus bar 23, the clock pulse input 26 of each memory location 25/1, 25/2, ... 25/n of the memory 25 being connected to one of the outputs 1, 2, ... n of the multiplex generator 19.

The multiplex generator 19 emits successive clock pulse signals of the same magnitude and duration at each of its outputs 1, 2, ... n, in succession. Thus, if there is a clock pulse signal at the output 1, only the code outputs 21 of the coding switch 20/1 connected thereto emit a data word corresponding to the switch position to the bus line 23, in the present case the binary data word 0001 if the switch is in position 1. If the clock pulse signal from output 1 is simultaneously present at the clock pulse input 26 of the first memory location 25/1 of the memory 25, the binary coded data word of the associated coding switch 20/1, which data word represents a parameter value, is stored in the first memory location 25/1 of the memory 25.

In a corresponding manner the parameter values set at the remaining coding switches 20/2 ... 20/n are fed into the further memory locations 25/2-25/n of the memory 25 in the rhythm of the clock pulse train from multiplex generator 19. Renewed interrogation and storage of the values set at the coding switches 20 then takes place continuously with every repetition of the clock pulse sequence from the multiplex generator 19. The data stored in the individual memory locations 25/1, 25/2 ... 25/n of the memory 25 can then be interrogated, for example, by means of a microprocessor (not shown) and processed further the memory possibly being a component of a microcomputer.

Figure 2:
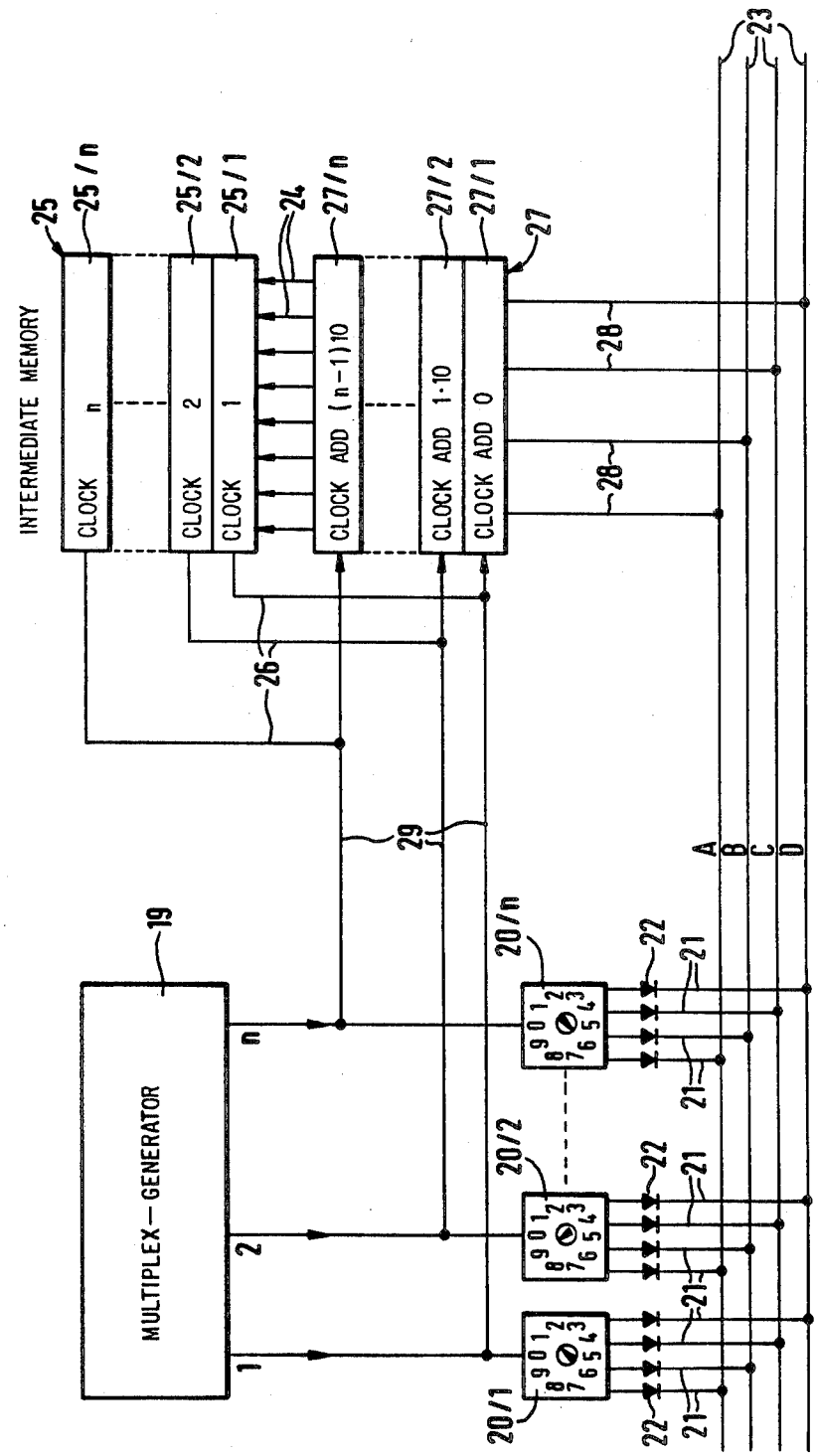
FIG. 2 is a diagram of a circuit arrangement according to the invention with an adder connected ahead of the memory inputs.

The embodiment shown in FIG. 2 is similar to that of FIG. 1 except that an n-stage adder 27 is connected between the bus bar 23 and the memory 25, the adder 27 again having only four inputs 28 each connected to a respective one of the four conductors of the bus bar 23. Each stage 27/1, 27/2, ... 27/n of the adder 27 has its own associated clock pulse input 29 connected to the clock pulse input 26 of a respective memory location. The clock pulse input 26 of a corresponding memory location of the memory 25 and the clock pulse input 29 of a corresponding stage of the adder 27 are connected, together with the associated coding switch 20, to one respective output of the multiplex generator 19.

In each stage of the adder 27, a fixed binary value is added to the input value, which value is different from one stage to the next. For example, at the first clock pulse from the multiplex generator 19, the value zero is added in the first stage 27/1 of the adder 27 to the value provided by the first coding switch 20/1 so that the value emitted by the first coding switch 20/1 is present at the outputs of the adder 27 connected with the inputs 24 of the memory 25. As previously indicated, the output from each coding switch corresponds to a decimal value of 0 to 9, and could by way of example represent a decimal 1, or binary 0001. At the second clock pulse, however, the value corresponding to decimal 10 is added to the value emitted by the second coding switch 20/2 in the second stage 27/2 of the adder so that a value between 10 and 19, in the present setting of coding switch 20/2 to the value 5, the decimal value 15, is furnished to the second stage 25/2 of the memory 25.

Due to the possible switch positions from 0 to 9 for each coding switch 20, each further stage of the adder 27 thus adds a constant value, increased by 10, to the input value. Thus data words which differ from one another in value are stored in the individual stages 25/1 to 25/n of the memory so that, for example, a microprocessor can obtain directly from its own memory 25 data values which differ from one another.

Figure 3:
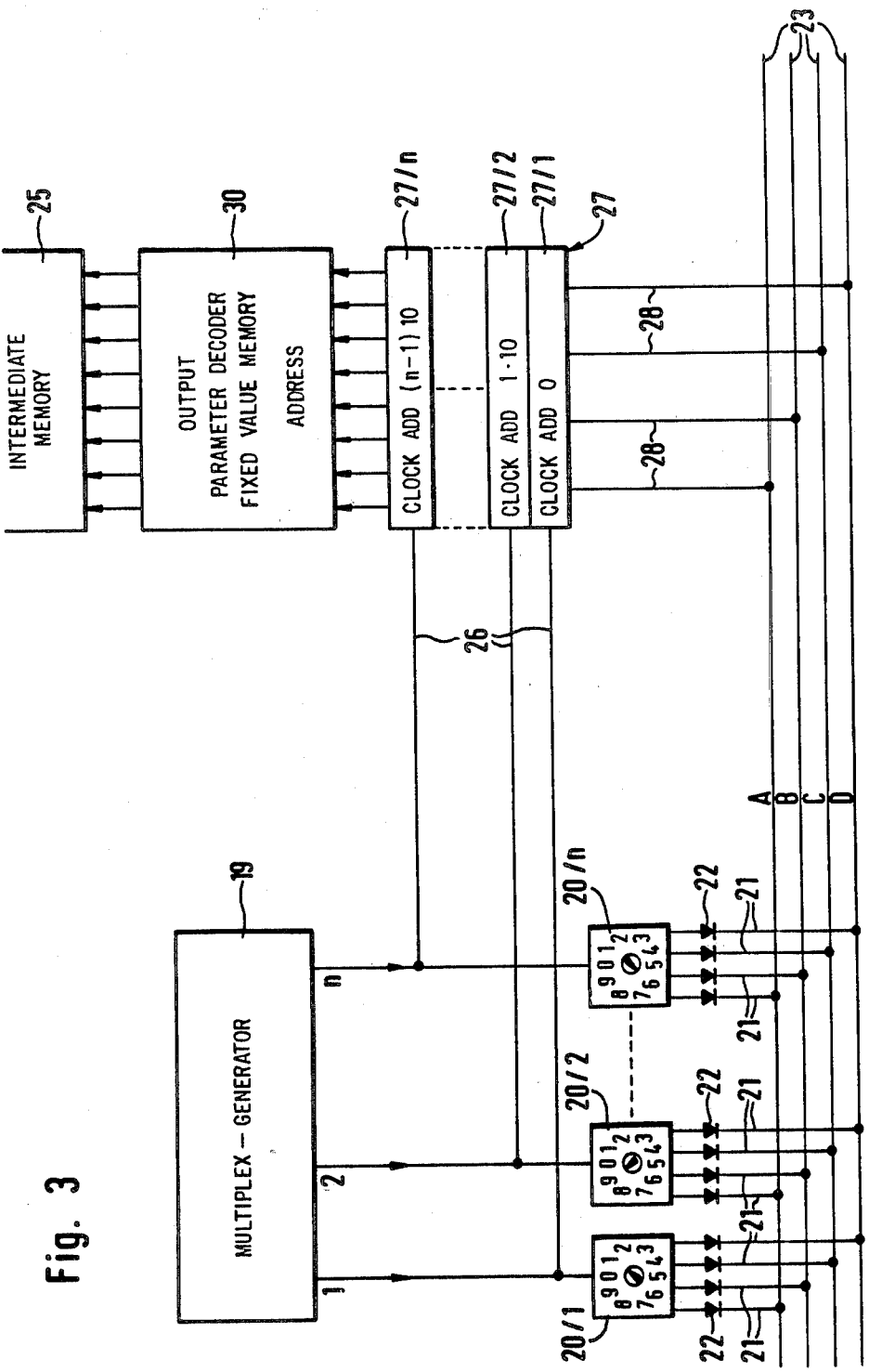
FIG. 3 is a similar diagram of a circuit arrangement with an adder connected ahead of the memory inputs and a subsequent address memory.

In the circuit arrangement according to FIG. 3, the connection of the multiplex generator 19 and the coding switches 20 to the bus bar 23 is again the same and again an adder 27 is connected, via clock pulse inputs 26 of the individual stages 27/1, 27/2, to 27/n, to the outputs 1, 2 through n. The function of the adder 27 is here the same as that described in connection with FIG. 2, but the data signals furnished by the adder 27 are here fed to the address inputs of a parameter decoder 30 which is designed as a fixed value memory. The memory locations of the parameter decoder 30 are addressed by the words provided by adder 27 and contain the "real" parameters for the processing of data which can be intermediately statically stored in memory 25. Multiplex generator, adder, parameter decoder and static intermediate memories may here also be components of a microcomputer. The memory 25 is addressed by the outputs of generator 19 in the same manner as described in connection with FIG. 2.

Circuit arrangements of this type are particularly suitable for electronic heat accumulator controls since they conduct the large number of parameter values as determined by certain regulations in the control process over a minimum number of inputs. Thus, for example, the upper or the lower temperature limit of an outside temperature range to be considered can be selected by setting coding switches 20/1 and 20/2, while further coding switches can serve for setting the beginning and end of the possible charging periods.

it will be understood that the above description of the present invention is susceptible to various modifications, changes and adaptions, and the same are intended to be comprehended within the meaning and range of equivalents of the appended claims.

What is claimed is:

1. In a circuit arrangement including a plurality of multi-position data switches and a memory connected for storing, in respective addressable memory locations, representations of the positions of the data switches, the improvement wherein each said data switch is a multi-digit coding switch having an actuating input and a plurality of code outputs at which appear a set of signals representative of the setting of said switch upon appearance of a signal at said actuating input, with successive settings of each said coding switch having successive numerical values and the signals appearing at said outputs of each said coding switch representing the numerical value of the current setting of that switch, and said arrangement further comprises: multiplex generator means having a plurality of clock outputs each connected to said actuating input of a respective coding switch, said generator means being arranged to produce a sequence of pulse signals and to deliver each pulse signal of the sequence to a respective clock output; a bus bar composed of a plurality of conductors equal in number to the number of code outputs of each said coding switch, with each said conductor being connected to a respective coding output of each said coding switch so that the appearance of a signal at said actuating input of one said coding switch causes the set of signals representative of the current setting of that said switch to appear on said conductors; and signal transmitting means connected between said bus bar and said memory, said signal transmitting means comprising adding means having a plurality of data inputs each connected to a respective conductor, a plurality of stages equal in number to the number of coding switches and each presenting a representation of a selected numerical value and arranged to add that representation to the numerical value representation supplied to that stage via said conductors, and a plurality of data outputs at which appear representations of the results of such additions; and wherein said memory has a plurality of data inputs each connected to a respective data output, and a number of memory locations equal to the number of said coding switches; each said clock output is connected to said adding means and to said memory for causing a pulse signal on a respective clock output to supply the numerical representation signals then appearing on said conductors to a respective associated adding stage and to address a respective associated memory location for storage therein of the representation then appearing at said data outputs; and the selected numerical value representation presented by each said adding means stage represents a numerical value which differs from that of every other stage by at least the number of possible settings of each said coding switch.

2. Circuit arrangement as defined in claim 1 wherein each said data switch comprises a plurality of rectifiers each connected in series between a respective code output and a respective conductor, with all rectifiers being connected to have the same direction of forward conduction.

3. In a circuit arrangement including a plurality of multi-position data switches and a memory connected for storing, in respective addressable memory locations, representations of the positions of the data switches, the improvement wherein each said data switch is a multi-digit coding switch having an actuating input and a plurality of code outputs at which appear a set of signals representative of the setting of said switch upon appearance of a signal at said actuating input, with successive settings of each said coding switch having successive numerical values and the signals appearing at said outputs of each said coding switch representing the numerical value of the current setting of that switch, and said arrangement further comprises: multiplex generator means having a plurality of clock outputs each connected to said actuating input of a respective coding switch, said generator means being arranged to produce a sequence of pulse signals and to deliver each pulse signal of the sequence to a respective clock output; a bus bar composed of a plurality of conductors equal in number to the number of code outputs of each said coding switch, with each said conductor being connected to a respective coding output of each said coding switch so that the appearance of a signal at said actuating input of one said coding switch causes the set of signals representative of the current setting of that said switch to appear on said conductors; and signal transmitting means connected between said bus bar and said memory, said signal transmitting means comprising adding means having a plurality of data inputs each connected to a respective conductor, a plurality of stages equal in number to the number of coding switches and each presenting a representation of a selected numerical value and arranged to add that representation to the numerical value representation supplied to that stage via said conductors, and a plurality of data outputs at which appear representations of the results of such additions; and wherein each said clock output is connected to said adding means for causing a pulse signal on a respective clock output to supply the numerical representation signals then appearing on said conductors to a respective associated adding stage; the selected numerical value representation presented by each said adding means stage represents a numerical value which differs from that of every other stage by at least the number of possible settings of each said coding switch; and said signal transmitting means further comprise a read-only memory having address inputs connected to said data ouputs and a plurality of memory locations each addressable by a selected representation applied to said address inputs.

4. Circuit arrangement as defined in claim 3 wherein each said data switch comprises a plurality of rectifiers each connected in series between a respective code output and a respective conductor, with all rectifiers being connected to have the same direction of forward conduction.

* * * * *